United States Patent
Bertolini et al.

(10) Patent No.: US 10,680,521 B1
(45) Date of Patent: Jun. 9, 2020

(54) BOOST DC-DC CONVERTER CIRCUIT WITH SMART ANTI-RING CIRCUIT ACTUATION

(71) Applicant: STMicroelectronics S.r.l., Agrate Brianza (IT)

(72) Inventors: Alessandro Bertolini, Vermiglio (IT); Alberto Cattani, Cislago (IT)

(73) Assignee: STMicroelectronics S.r.l., Agrate Brianza (MB) (IT)

( * ) Notice: Subject to any disclaimer, the term of this patent is extended or adjusted under 35 U.S.C. 154(b) by 0 days.

(21) Appl. No.: 16/555,262

(22) Filed: Aug. 29, 2019

(51) Int. Cl.
*H02M 3/156* (2006.01)
*H02M 3/158* (2006.01)
*H02M 3/155* (2006.01)

(52) U.S. Cl.
CPC .......... *H02M 3/1582* (2013.01); *H02M 3/155* (2013.01); *H02M 3/156* (2013.01)

(58) Field of Classification Search
CPC . H02M 2001/0012; H02M 2001/0009; H02M 2001/385; H02M 2001/4283; H02M 2001/4291; H02M 3/156; H02M 3/158; H02M 3/1588; H02M 3/155; H02M 3/1582; H02M 3/157; H02M 3/1563; H02M 3/1584; H02M 1/12; H02M 1/42; H02M 1/4225; H02M 1/4233; H02M 1/4241; H02M 1/4258; H02M 1/425; H02M 1/4208; G05F 1/70; H02J 3/16
See application file for complete search history.

(56) References Cited

U.S. PATENT DOCUMENTS

| | | | |
|---|---|---|---|
| 5,777,461 A | 7/1998 | Massie et al. | |
| 6,788,033 B2 | 9/2004 | Vinciarelli | |
| 7,154,250 B2 | 12/2006 | Vinciarelli | |
| 7,812,588 B1 * | 10/2010 | Soh ................. | H02M 3/1582 323/351 |
| 8,169,198 B2 | 5/2012 | Lin et al. | |

* cited by examiner

*Primary Examiner* — Bryan R Perez
(74) *Attorney, Agent, or Firm* — Crowe & Dunlevy

(57) ABSTRACT

An inductor and a shunt switch circuit are connected in parallel between an input node and an intermediate node. A first power transistor is connected between the intermediate node and a ground node. A second power transistor is connected between the intermediate node and an output node. The first and second power transistors are driven in response to a pulse width modulation (PWM) drive cycle having an on-time and an off-time. The input node receives a DC input voltage and a DC output voltage is generated at the output node. A control circuit senses the input and output nodes and determines whether the DC input voltage is within a threshold voltage of the DC output voltage. In response to that determination, the shunt switch circuit is turned on only during the off-time of the PWM drive cycle.

35 Claims, 2 Drawing Sheets

BOOST DC-DC CONVERTER CIRCUIT WITH SMART ANTI-RING CIRCUIT ACTUATION

TECHNICAL FIELD

Embodiments and implementations relate to a boost DC-DC converter circuit.

BACKGROUND

Reference is made to FIG. 1, which shows a circuit diagram for a conventional boost DC-DC converter circuit 10. A DC input voltage Vin is applied to an input node 12 and the circuit 10 generates a DC output voltage Vout at an output node 14. An inductor 16 is connected between the input node 12 and an intermediate node 18. A first transistor switch 20 (also referred to as a low-side switch) is connected between the intermediate node 18 and ground. The first transistor switch 20 may, for example, comprise an n-channel power transistor device having a drain terminal connected to the intermediate node 18 and a source terminal connected to ground. A control terminal of the first transistor switch 20 is driven by a pulse width modulated (PWM) drive signal 24. A second transistor switch 26 (also referred to as a high-side switch) is connected between the intermediate node 18 and the output node 14. The second transistor switch 26 may, for example, comprise an n-channel power transistor device having a drain terminal connected to the intermediate node 18 and a source terminal connected to the output node 14. A control terminal of the second transistor switch 20 is driven by a signal 30 which is 180° out of phase from (for example, a logical inversion of) the pulse width modulated (PWM) drive signal 24. A resistive voltage divider 34 is connected between the output node 14 and ground. The divider 34 is formed by the series connection of a first resistor 36 and a second resistor 38. A feedback voltage Vfb is generated at a tap node of the divider 34 between resistors 36 and 38, with the feedback voltage Vfb being a scaled version of the output voltage Vout. An output capacitor 40 is connected between the output node 14 and ground. The PWM drive signals 24 and 30 are generated by a PWM control circuit 44 in response to a comparison of the feedback voltage Vfb with a reference voltage Vref.

In operation, the drive signal 24 is asserted to turn on the low-side transistor 20. This connects the inductor 16 between the input node 12 and ground, and the current through the inductor increases. The drive signal 24 is then deasserted to turn off the low-side transistor 20 and the drive signal 30 is asserted to turn on the high-side transistor 26. The inductor current then discharges to the output capacitor 40 and the output voltage Vout rises. The output voltage Vout is sensed through the resistive voltage divider 34 to generate the feedback voltage Vfb, which is compared to the reference voltage Vref. The difference between Vfb and Vref, referred to as an error voltage, is used by the PWM control circuit 44 to set the length of time that the drive signal 24 is asserted to turn on the low-side transistor 20. One cycle of the PWM control signal for driving transistors 20 and 26 is formed by the on-time (Ton) of the low-side transistor 20 and the subsequent off-time (Toff) of the low-side transistor 20 (with the duty cycle of the PWM control signal being equal to Ton/(Ton+Toff)).

The DC-DC converter should be able to maintain a given performance even in conditions where the magnitude of the input voltage Vin is at a level that is very close to the desired magnitude of the output voltage Vout. Such operation is critical for a boost DC-DC converter; in fact, the closer that Vin gets to Vout, the more the converter struggles to accomplish small duty-cycles for the PWM control signals and performs poorly. In these harsh situations, the required duty-cycle for the PWM control signals should approach zero in order to maintain output regulation. More particularly, for a fixed frequency boost DC-DC converter this means that the on-time (Ton) of the drive signal 24 that is asserted to turn on the low-side transistor 20 should be reduced to zero. Unfortunately, there are problems with this because the on-time Ton is bottom-limited and cannot be reduced to zero. This is due to the fact that propagation delays, power transistor turn-on/off times and dead-times are unavoidable and limit the minimum feasible value for the on-time Ton.

A bottom limited on-time Ton translates to a bottom limited minimum current that accumulates inside the inductor 16 during on-time Ton and transfers to the output during off-time Toff with each cycle of converter operation. Such a limitation leads to an unavoidable natural skip behavior. In fact, when the voltage level of the input voltage Vin is very close to the output voltage Vout, skip mode occurs when the boost DC-DC converter is no longer able to perform with the theoretically required small duty-cycle. In other words, since the converter is not able to reduce its on-time Ton, it accumulates and then transfers on the output 14 a minimum current that is too high and Vout increases. As a result, the converter goes out of regulation. In these situations, it is common for the converter action to be inhibited by skipping one or more switching cycles, in order to regain the ability to maintain a regulated operation. As a result, no charge is delivered to the output when a switching cycle is skipped during skip mode.

Skip mode operation, however, inherently produces an undesirable output ripple that is greater than the ripple which occurs in the normal operating mode (i.e., continuous-conduction-mode (CCM)) for the boost converter. In some applications where boost converters are used, such behavior is not allowed. For example, in AMOLED applications the display-panel positive regulated supply is provided by the boost DC-DC converter and the output ripple on such rail directly translates into display flickering. Because of this, the output ripple must be minimized. For this reason, the DC-DC boost converter must remain in continuous-conduction-mode, and skip mode must be avoided.

A first possible solution to this problem is to instead use a buck-boost topology for the DC-DC converter. This would solve the skip mode related issues and would maintain the converter always in CCM as Vin approaches Vout. However, there is an unacceptable price to pay for using the buck-boost topology in many applications: the circuit topology requires more power transistor devices, is more complex, requires a larger silicon area for a comparable efficiency and experiences a higher current leakage through the power transistor devices.

A second possible solution is to exploit different control schemes. For example, the DC-DC frequency can be changed and reduced in order to achieve smaller duty-cycles (e.g., constant-on-time (COT) control, pulse frequency modulation (PFM) and so on). Such alternative solutions are not always possible due to customer requirements. Indeed, in some applications the customer explicitly requests the use of a fixed-frequency boost DC-DC converter (with a strictly imposed working frequency) and in those cases alternate control schemes are not an option.

SUMMARY

In an embodiment, a circuit comprises: an inductor; a first power transistor; wherein the inductor and the first power transistor are connected in series between a DC power supply node and a ground node; a shunt switch circuit connected in parallel with the inductor; a pulse width modulation (PWM) drive circuit configured to drive a control terminal of the first power transistor with a PWM drive signal having an on-time and an off-time; and a control circuit configured to sense an input voltage at the DC power supply node and to turn on the shunt switch circuit in response to a level of the sensed input voltage and only during the off-time of the PWM drive signal.

In an embodiment, a circuit comprises: an inductor connected between an input node and an intermediate node; a first power transistor connected between the intermediate node and a ground node, said first power transistor being turned on during an on-time of a pulse width modulation (PWM) drive cycle; a second power transistor connected between the intermediate node and an output node, said second power transistor being turned on during an off-time of the PWM drive cycle; a shunt switch circuit connected in parallel with the inductor between the input node and the intermediate node; wherein the input node receives a DC input voltage and a DC output voltage is generated at the output node; and a control circuit configured to sense the input and output nodes and determine whether the DC input voltage is within a threshold voltage of the DC output voltage and, in response to that determination, turn on the shunt switch circuit only during the off-time of the PWM drive cycle.

BRIEF DESCRIPTION OF THE DRAWINGS

Other advantages and features of the invention will become apparent on examining the detailed description of completely non-limiting embodiments and implementations, and the appended drawings, in which.

DETAILED DESCRIPTION

Figure 2:
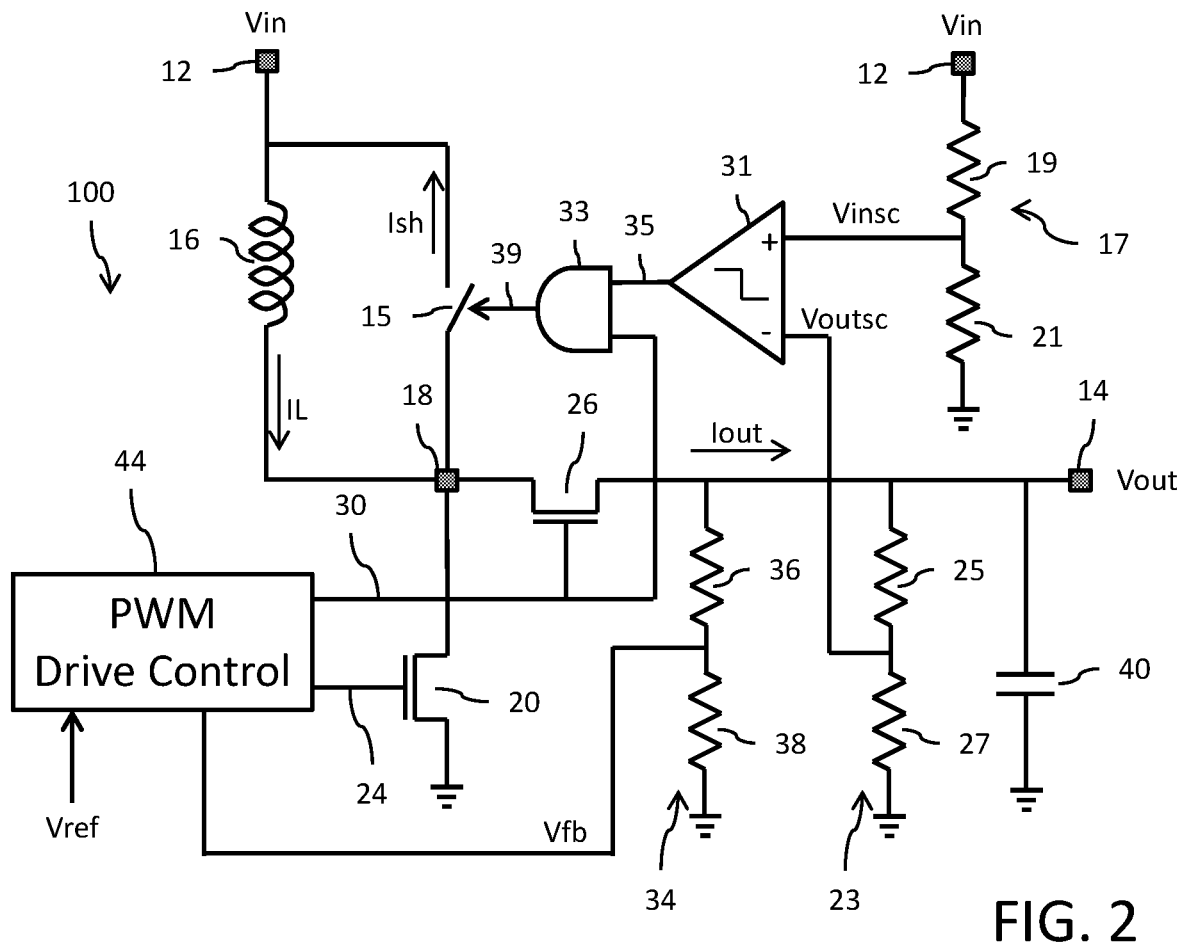
FIG. 2 is a circuit diagram for a boost DC-DC converter circuit in accordance with an embodiment of the invention.
Figure 3A:
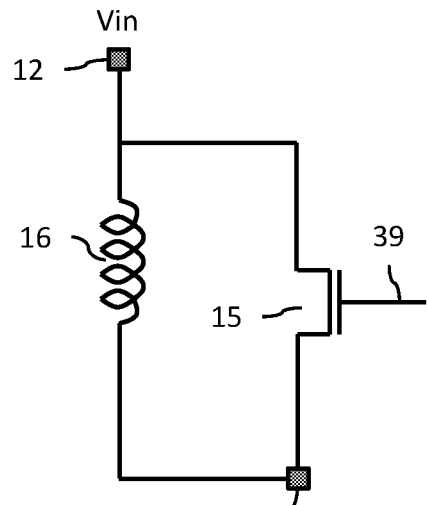
FIGS. 3A-3B are circuit diagrams for an example shunt switch.
Figure 3B:
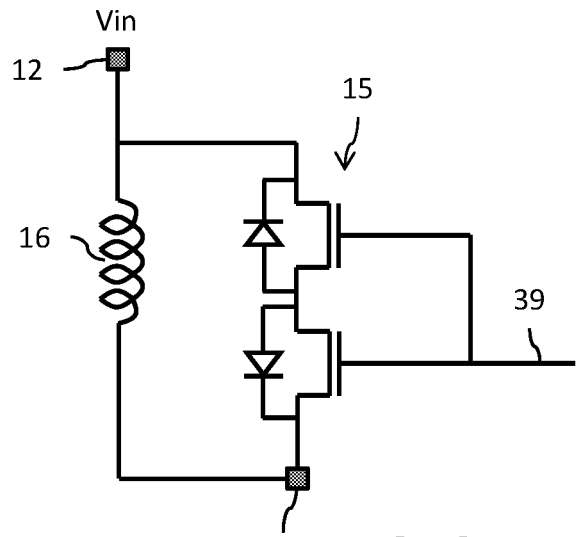

Reference is now made to FIG. 2 which shows a circuit diagram for a DC-DC converter circuit 100 in accordance with an embodiment of the invention. A DC input voltage Vin is applied to an input node 12 and the circuit 10 generates a DC output voltage Vout at an output node 14. An inductor 16 is connected between the input node 12 and an intermediate node 18. A shunt switch 15 is also connected between the input node 12 and the intermediate node 18 in parallel with the inductor 16. The shunt switch 15 may, for example, comprise an n-channel power transistor device having a drain terminal connected to the intermediate node 18 and a source terminal connected to the input node 12 (see, for example, FIG. 3A). Alternatively, the shunt switch 15 may comprise a plurality of power transistor devices connected in series between the input node 12 and the intermediate node 18 (see, for example, FIG. 3B showing the use of a series connection of two n-channel power transistor devices).

A first transistor switch 20 (also referred to as a low-side switch) is connected between the intermediate node 18 and ground. The first transistor switch 20 may, for example, comprise an n-channel power transistor device having a drain terminal connected to the intermediate node 18 and a source terminal connected to ground. A control terminal of the first transistor switch 20 is driven by a pulse width modulated (PWM) drive signal 24. A second transistor switch 26 (also referred to as a high-side switch) is connected between the intermediate node 18 and the output node 14. The second transistor switch 26 may, for example, comprise an n-channel power transistor device having a drain terminal connected to the intermediate node 18 and a source terminal connected to the output node 14. A control terminal of the second transistor switch 20 is driven by a signal 30 which is 180° out of phase from (for example, a logical inversion of) the pulse width modulated (PWM) drive signal 24.

A resistive voltage divider 34 is connected between the output node 14 and ground. The divider 34 is formed by the series connection of a first resistor 36 and a second resistor 38. A feedback voltage Vfb is generated at a tap node of the divider 34 between resistors 36 and 38, with the feedback voltage Vfb being a scaled version of the output voltage Vout.

The PWM drive signals 24 and 30 are generated by a PWM control circuit 44 in response to a comparison of the feedback voltage Vfb with a reference voltage Vref.

An output capacitor 40 is connected between output node 14 and ground.

A resistive voltage divider 17 is connected between the input node 12 and ground. The divider 17 is formed by the series connection of a first resistor 19 and a second resistor 21. A voltage Vinsc is generated at a tap node of the divider 17 between resistors 19 and 21, with the voltage Vinsc being a scaled version of the input voltage Vin.

A resistive voltage divider 23 is connected between the output node 14 and ground. The divider 23 is formed by the series connection of a first resistor 25 and a second resistor 27. A voltage Voutsc is generated at a tap node of the divider 23 between resistors 25 and 27, with the voltage Voutsc being a scaled version of the output voltage Vout. In an embodiment, the same resistive voltage divider could be used to generate Vfb and Voutsc, and in such a case Vfb=Voutsc. Alternatively, a single resistive voltage divider with multiple tap nodes could be used to generate Vfb and Voutsc.

A voltage comparator circuit 31 (with a hysteresis voltage Vhyst) has a first (non-inverting) input that receives the scaled input voltage Vinsc and a second (inverting) input that receives the scaled output voltage Voutsc. The voltage comparator circuit 31 functions to compare the scaled input voltage Vinsc to the scaled output voltage Voutsc and from that comparison determine whether a difference between the scaled input voltage Vinsc and the scaled output voltage Voutsc is less than the hysteresis voltage Vhyst (i.e., when Vinsc−Voutsc<Vhyst). In other words, the voltage comparator circuit 31 detects when a difference between the input voltage Vin and output voltage Vout is less than a comparison threshold voltage Vth that is set by the hysteresis voltage Vhyst (i.e., when Vin−Vout<Vth, wherein Vth may, for example, equal 200 mV). In response to Vinsc−Voutsc<Vhyst (i.e., Vin−Vout<Vth), the output 35 of the voltage comparator circuit 31 is asserted logic high. A logic circuit in the form of a logical AND gate 33 has a first input that receives the output 35 of the voltage comparator circuit 31 and a second input that receives the signal 30 which is a logical inversion of the pulse width modulated (PWM) drive signal 24. The signal 30 is logic high when the pulse width modulated (PWM) drive signal 24 is logic low (in other words, logic low during on-time Ton and logic high during off-time Toff). When both the output 35 and the signal 30 are logic high, the output 39 of the AND gate 33 is logic high and the shunt switch 15 is actuated (i.e., turned on) to couple the intermediate node 18 to the input node 12 through a resistive circuit connection (for example, a source-drain path of an actuated transistor) having a resistance Ron.

In operation, the drive signal 24 is asserted to turn on the low-side transistor 20 for a duration of time Ton. This connects the inductor 16 between the input node 12 and ground and a current IL through the inductor increases. The drive signal 24 is then deasserted to turn off the low-side transistor 20 and the drive signal 30 is asserted to turn on the high-side transistor 26 for a duration of time Toff. The inductor current then discharges with current Iout delivered to the output capacitor 40 and the output voltage Vout rises. The output voltage Vout is sensed through the resistive voltage divider 34 to generate the feedback voltage Vfb, which is compared to the reference voltage Vref. The difference between Vfb and Vref, referred to as an error voltage, is used by the PWM control circuit 44 to set the length of time that the drive signal 24 is asserted to turn on the low-side transistor 20 (i.e., the on-time Ton) relative to the cycle period of the PWM control signal, given by the sum of Ton and Toff.

The voltage comparator circuit 31 compares the input voltage Vin to the output voltage Vout (through a comparison of the scaled input voltage Vinsc and scaled output voltage Voutsc generated by the voltage dividers 17 and 23). If the input voltage Vin is at a level within the threshold voltage Vth of the output voltage Vout, the output 35 of the voltage comparator circuit 31 is asserted logic high (because the difference between the scaled input voltage Vinsc and the scaled output voltage Voutsc is less than the hysteresis voltage Vhyst). When the signal 30 (which is a logical inversion of the pulse width modulated (PWM) drive signal 24) is simultaneously asserted logic high at the end of the on-time Ton (this time period corresponding to the off-time (Toff) of the converter), the logic AND gate 33 will drive the signal 39 logic high to turn on the shunt switch 15 and permit a shunt current Ish to flow from the intermediate node 18 to the input node 12. This current Ish reduces the magnitude of the current Iout being delivered to the load capacitor 40 (Iout=IL−Ish). The operation of the actuated shunt switch 15 effectively steers a portion of the current accumulated in the inductor 16 back to the input node 12. The magnitude of the shunt current Ish is given by Ish=(Vout−Vin)/Ron, where Ron is the on resistance of the resistive circuit connection (for example, source-drain path of an actuated transistor) between the intermediate node 18 to the input node 12.

In continuous-conduction-mode (CCM), the normal operation is that during on-time Ton the inductor 16 is charged at Vin by closing the low-side switch transistor 20, and then during off-time Toff the inductor 16 is discharged to Vout by opening the low-side switch transistor 20 and closing the high-side switch transistor 26, to deliver the current Iout to the load capacitor 40. With Vin at a level that is close to Vout, the duty cycle is adjusted and the on-time Ton is reduced. For the reasons discussed elsewhere herein, it is not possible to drive the on-time Ton to zero. The actuation of the shunt switch 15 during off-time Toff (i.e., during the inductor 16 discharge phase), permits the current IL accumulated inside the inductor 16 to discharge to both the output node 14 (as is usual) through switch 26 as current Iout and back to the input node 12 through the switch 15 as current Ish. As a result, the boost DC-DC converter 100 is forced to maintain a larger on-time Ton (i.e., during the inductor 16 charge phase), in order to accumulate the extra current needed to maintain Vout in regulation.

The actuation of the shunt switch 15 in response to the input voltage Vin being within the threshold voltage Vth of the output voltage Vout supports continued operation of the boost DC-DC converter 100 in CCM for a much wider range of voltages. As a result, undesired skip mode behavior is mitigated and delayed (and perhaps even completely avoided). The design and sizing of the shunt switch 15 sets the on resistance (Ron) of the device in order to ensure that CCM operation is guaranteed for a desired difference between the output voltage Vout and the input voltage Vin.

The syphoning of the current Ish from the intermediate node 18 when the shunt switch 15 is actuated is effectively equivalent to the addition of an extra load to the converter 100. Advantageously, the additional load is on the input node 12, not the output node 14, and for that reason the efficiency of the converter 100 is minimally affected by actuation of the shunt switch 15. In fact, during off-time Toff the extra inductor current IL that is accumulated is recovered through the shunt current Ish back to the input node 12 at the input voltage Vin and is, therefore, not wasted, but is instead effectively recycled.

In general, the dynamic performances of the converter 100 are heightened, since for a given input voltage Vin and output voltage Vout the converter 100 is not pushed to work at its lower limit or minimum value of on-time (Ton) for the inductor charging phase.

Figure 4:
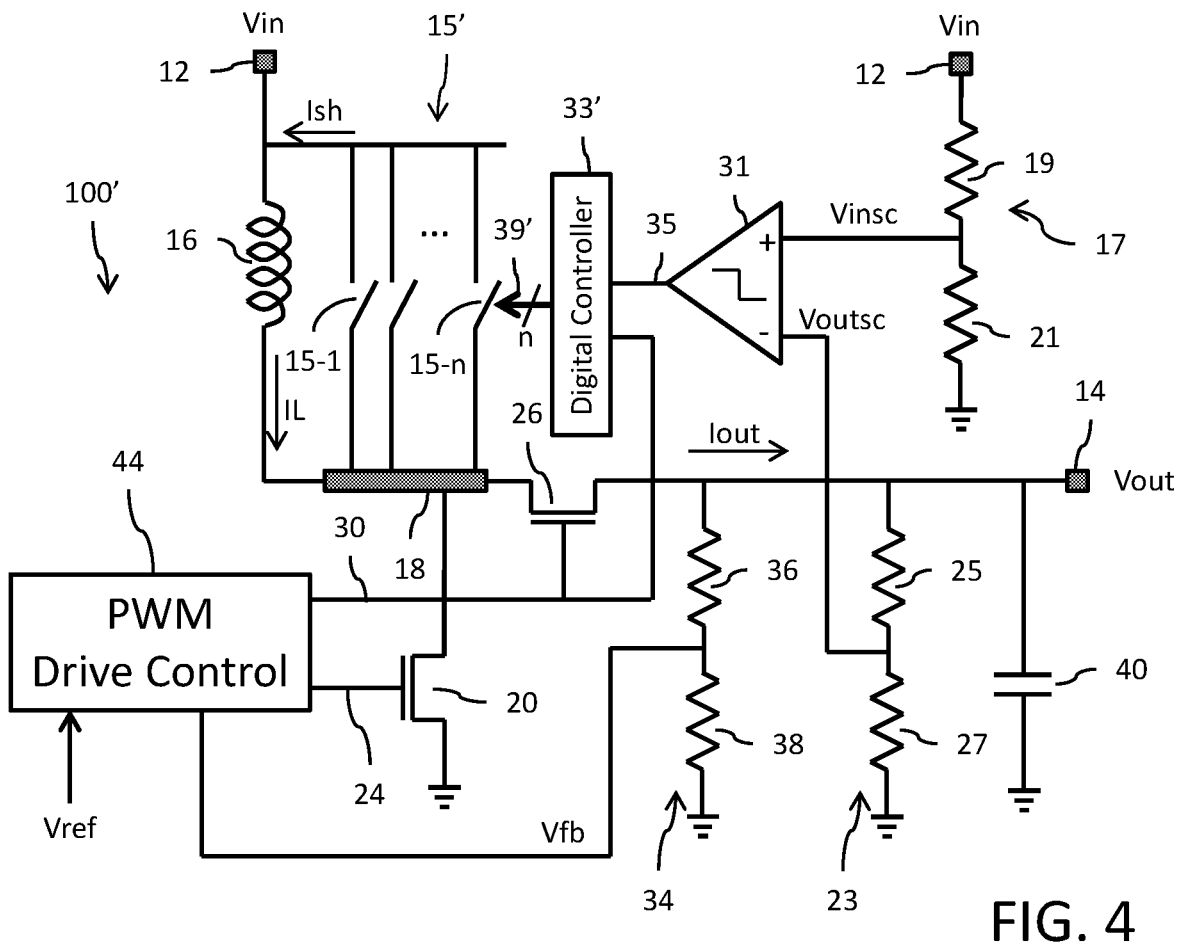
FIG. 4 is a circuit diagram for a boost DC-DC converter circuit in accordance with another embodiment of the invention.

If the on resistance (Ron) of the shunt switch 15 is relatively low (such as would be the case if the switch 15 were implemented as a single, large power transistor device), the actuation of the shunt switch 15 by the signal 39 can perturb the operation of the DC-DC converter 100 and lead to an undesirable transient in the output voltage Vout. This is especially true if the shunt switch 15 is sized to steer a substantial magnitude for the shunt current Ish in comparison to the load current IL. To address this concern, FIG. 4 shows a circuit diagram for an alternative embodiment of the converter 100'. The converter 100' of FIG. 4 differs from the converter 100 in FIG. 2 in terms of the implementation of the shunt switch 15' to have a variable on resistance (Ron_var). The shunt switch 15' is formed by a plurality (in this case, n) of switch circuits 15-1 to 15-n connected in parallel with each other between the input node 12 and the intermediate node 18, the shunt switch 15' furthermore being connected in parallel with the inductor 16. Each switch circuit 15-1, 15-n of the shunt switch 15' may, for example, comprise a circuit such as shown by FIG. 3A or FIG. 3B, and further have an on resistance (Ron) when actuated.

The converter 100' of FIG. 4 further differs from the converter 100 in FIG. 2 in terms of the implementation of the logic circuit which is configured as a digital control circuit 33' operating to generate a plurality (in this case, n) of control signals 39' for individually controlling the actuation of the switch circuits 15-1 to 15-n for the variable resistance shunt switch 15'. The control over the individual actuation of the switch circuits 15-1 to 15-n permits the setting of the variable on resistance (Ron_var) for the shunt switch 15'. As a non-limiting example, consider the circuit architecture where the switch circuits 15-1 to 15-n are matched transistors with substantially identical on resistances: if only a single switch circuit 15 is actuated, the on resistance Ron_var is equal to the on resistance Ron of that actuated switch circuit 15; if instead two switch circuits 15 are actuated, then the on resistance Ron_var is equal to one-half of the on resistance Ron; and if instead three switch circuits 15 are actuated, then the on resistance Ron_var is equal to one-third of the on resistance Ron. More generally speaking, however, the designer for the circuit architecture can utilize switch circuits 15-1 to 15-n having different on resistances. Thus, it will be understood that the variable on resistance Ron_var for the shunt switch 15' decreases in a known and controllable way with each additional switch circuit 15-1 to 15-n that is actuated by the digital control circuit 33'.

The digital control circuit 33' is enabled for operation in response to assertion logic high of the output 35 of the voltage comparator circuit 31 (when the difference between the scaled input voltage Vinsc and the scaled output voltage Voutsc is less than the hysteresis voltage Vhyst). In response to being enabled by signal 35, the digital control circuit 33' will generate the control signals 39' in response to the signal 30 output from the PWM drive controller 44 (during off-time Toff following the end of the on-time Ton). The control signals 39' are generated in manner which will sequentially actuate (i.e., turn on) the n switch circuits 15-1 to 15-n. As a result, the variable on resistance Ron_var for the shunt switch 15' is gradually decreased from an infinite resistance (or open circuit condition) to the on resistance of a single switch circuit 15 (for example, Ron), and further through one or more steps ending at the on resistance of n switch circuits 15 in parallel (for example, Ron/n).

The operation of the digital control circuit 33' is disabled in response to a logic low value of the output 35 of the voltage comparator circuit 31 (when the difference between the scaled input voltage Vinsc and the scaled output voltage Voutsc is greater than the hysteresis voltage Vhyst). In response to being disabled by signal 35, the digital control circuit 33' will generate the control signals 39' in response to the signal 30 output from the PWM drive controller 44 (during off-time Toff following the end of the on-time Ton). The control signals 39' are generated in manner which will sequentially deactuate (i.e., turn off) the n switch circuits 15-1 to 15-n. As a result, the variable on resistance Ron_var for the shunt switch 15' is gradually increased from the on resistance of n switch circuits 15 in parallel (for example, Ron/n), and further through one or more steps to the on resistance of a single switch circuit 15 (i.e., Ron), and then to an infinite resistance (or open circuit condition).

One or more switching cycles of the PWM control signal generated by the PWM drive controller 44 may occur between consecutive steps in the gradual decrease/increase of the variable on resistance Ron_var through selective actuation/deactuation of individual ones of the n switch circuits 15-1 to 15-n. As an example of this: one switch 15 may be actuated/deactuated in a first cycle of the PWM drive signal by the control signals 39', with second, third and fourth immediately subsequent cycles occurring without a change in the control signals 39', then a next switch 15 may be actuated/deactuated in a fifth immediately subsequent cycle of the PWM drive signal.

It will be noted that the gradual decrease/increase of the variable on resistance Ron_var for the shunt switch 15' due to operation of the digital control circuit 33' will advantageously result in a sharper behavior and the avoidance of unwanted transients on the output voltage Vout.

Figure 1:
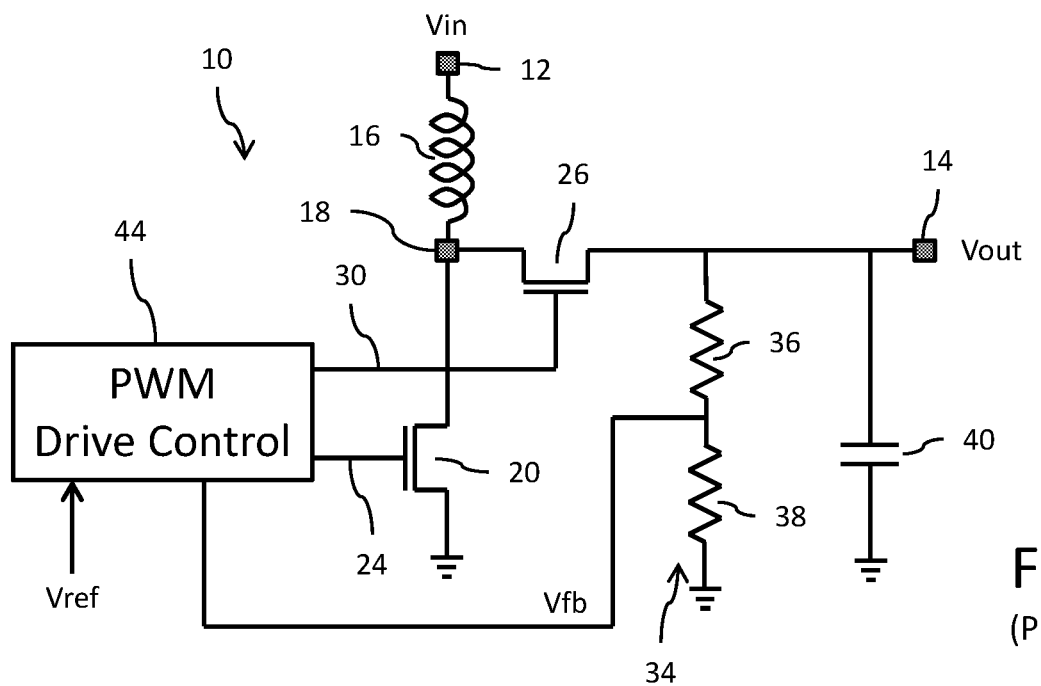
FIG. 1 is a circuit diagram for a conventional boost DC-DC converter circuit.

The use of the shunt switch 15, 15' solutions of FIGS. 2 and 4 presents the following advantages over prior art solutions: a) the converter 100, 100' performances are enhanced with minimal effort implementation and the boost DC-DC is able to guarantee high performances at higher input voltages Vin without use of skip mode; b) actuation of the shunt switch 15, 15' in the manner proposed has a negligible impact on overall efficiency of the converter 100, 100'; specifically, the impact on the efficiency is very low, negligible and limited to Joule losses and switching losses to drive the shunt switch 15, 15'; c) in terms of circuit area consumption, there are negligible differences respect to an equivalent common/usual/standard architecture (see, FIG. 1, for example); d) the shunt switch 15, 15' is in some circuit implementations already deployed in the DC-DC converter for a different purpose as an anti-ring (i.e., ring-killer) switch that dampens ringing at node 18 in other function modes (e.g., in discontinuous-conduction-mode (DCM)), see FIG. 7, for example, of U.S. Pat. No. 8,169,198 (incorporated by reference), so there is minimal added system complexity to additionally use the shunt switch driven by a different circuit (references 17, 23, 31, 33, 33') to address concerns when Vin is at a level close to Vout; and e) the circuit implementation requires no trimming actions (i.e., there is no need for a final calibration or tuning implemented, for example, through a calibration or tuning procedure to be followed when the chip comes out from the fab).

While the invention has been illustrated and described in detail in the drawings and foregoing description, such illustration and description are considered illustrative or exemplary and not restrictive; the invention is not limited to the disclosed embodiments. Other variations to the disclosed embodiments can be understood and effected by those skilled in the art in practicing the claimed invention, from a study of the drawings, the disclosure, and the appended claims.

The invention claimed is:

1. A circuit, comprising: an inductor;
   a first power transistor; wherein the inductor and the first power transistor are connected in series between a DC power supply node and a ground node;
   a shunt switch circuit connected in parallel with the inductor;
   a pulse width modulation (PWM) drive circuit configured to drive a control terminal of the first power transistor with a PWM drive signal having an on-time and an off-time; and
   a control circuit configured to receive the PWM drive signal, sense a difference between an input voltage at the DC power supply node and an output voltage generated at a DC output node, and turn on the shunt switch circuit in response to a level of the sensed difference and when the received PWM drive signal is in the off-time so as to pass a portion of an inductor current output by the inductor during the off-time back to the DC power supply node through the shunt switch circuit.

2. The circuit of claim 1, wherein the PWM drive circuit generates the PWM drive signal for operating the inductor of the circuit in a continuous-conduction-mode (CCM).

3. The circuit of claim 1, wherein the level of the sensed difference is satisfied when the input voltage is within a threshold voltage of the output voltage.

4. The circuit of claim 3, further comprising a conduction circuit connected between the output node and an intermediate node of the series-connected inductor and first power transistor.

5. The circuit of claim 4, wherein the conduction circuit is a second power transistor.

6. The circuit of claim 4, wherein the conduction circuit passes an output current to the DC output node during the off-time of the PWM drive signal.

7. The circuit of claim 3, wherein the control circuit comprises:

a first voltage sensing circuit configured to sense the input voltage at the DC power supply node and generate a first signal;
a second voltage sensing circuit configured to sense the output voltage at the DC output node and generate a second signal;
a comparator circuit with hysteresis configured to compare the first and second signals and generate an enable signal; and
a logic circuit enabled in response to the enable signal and configured to turn on the shunt switch circuit in response to the received PWM drive signal being in the off-time.

8. The circuit of claim 7, wherein the logic circuit is a logical AND gate having a first input receiving the enable signal, a second input receiving a logical inversion of the PWM drive signal and an output generating a third signal to turn on the shunt switch circuit.

9. The circuit of claim 8, wherein the shunt switch circuit is a transistor switch having a control terminal driven by said third signal.

10. The circuit of claim 8, wherein the shunt switch circuit is a pair of transistor switches connected in series, the transistor switches of said pair having control terminals driven in response to said third signal.

11. The circuit of claim 7, wherein the shunt switch circuit has a controllable variable resistance, and wherein the logic circuit is a digital control circuit configured to generate a plurality of control signals applied to the shunt switch circuit to set a level of the controllable variable resistance of the shunt switch circuit.

12. The circuit of claim 11, wherein the shunt switch circuit comprises a plurality of transistor switches connected in parallel with each other, and wherein a control terminal of each transistor switch receives one control signal of said plurality of control signals.

13. The circuit of claim 12, wherein the digital control circuit generates the plurality of control signals to sequentially turn on transistor switches of the plurality of transistor switches connected in parallel to decrease the level of the controllable variable resistance over a period of time.

14. The circuit of claim 13, wherein the period of time extends over plural cycles of the PWM drive signal.

15. The circuit of claim 14, wherein at least one cycle of the PWM drive signal occurs between two consecutive steps in the sequential turn on of the transistor switches of the plurality of transistor switches.

16. The circuit of claim 1, further comprising a second power transistor coupled between the DC output node and an intermediate node of the series-connected inductor and first power transistor.

17. The circuit of claim 16, wherein the level of the sensed difference is satisfied when the input voltage is within a threshold voltage of the output voltage.

18. The circuit of claim 16, wherein the PWM drive circuit turns on the second power transistor during the off-time of the PWM drive signal.

19. The circuit of claim 1, wherein the shunt switch circuit is a transistor switch having a control terminal driven in response to an output signal from the control circuit.

20. The circuit of claim 1, wherein the shunt switch circuit is a pair of transistor switches connected in series, the transistor switches having control terminals driven in response to an output signal from the control circuit.

21. The circuit of claim 1, wherein the shunt switch circuit has a controllable variable resistance, and wherein the control circuit is configured to set a level of the controllable variable resistance of the shunt switch circuit.

22. The circuit of claim 21, wherein the shunt switch circuit comprises a plurality of transistor switches connected in parallel with each other, and wherein the control circuit is configured to generate a plurality of control signals applied to control terminals of the transistor switches.

23. The circuit of claim 22, wherein the control circuit generates the plurality of control signals to sequentially turn on transistor switches of the plurality of transistor switches connected in parallel to decrease the level of the controllable variable resistance over a period of time.

24. The circuit of claim 23, wherein the period of time extends over plural cycles of the PWM drive signal.

25. The circuit of claim 24, wherein at least one cycle of the PWM drive signal occurs between two consecutive steps in the sequential turn on of the transistor switches of the plurality of transistor switches.

26. A circuit, comprising: an inductor connected between an input node and an intermediate node; a first power transistor connected between the intermediate node and a ground node, said first power transistor being turned on during an on-time of a pulse width modulation (PWM) drive cycle;
a second power transistor connected between the intermediate node and an output node, said second power transistor being turned on during an off-time of the PWM drive cycle;
a shunt switch circuit connected in parallel with the inductor between the input node and the intermediate node;
wherein the input node receives a DC input voltage and a DC output voltage is generated at the output node; and
a control circuit configured to sense the input and output nodes and determine whether the DC input voltage is within a threshold voltage of the DC output voltage and, in response to that determination and the PWM drive cycle being in the off-time, turn on the shunt switch circuit to pass a portion of an inductor current output by the inductor during the off-time of the PWM drive cycle back to the input node through the shunt switch circuit.

27. The circuit of claim 26, further comprising a PWM drive circuit configured to drive a control terminal of the first power transistor and drive a control terminal of the second power transistor in accordance with the PWM drive cycle.

28. The circuit of claim 26, wherein the shunt switch circuit is a transistor switch having a control terminal driven in response to an output signal from the control circuit.

29. The circuit of claim 26, wherein the shunt switch circuit is a pair of transistor switches connected in series, the transistor switches of said pair having control terminals driven in response to an output signal from the control circuit.

30. The circuit of claim 26, wherein the shunt switch circuit has a controllable variable resistance, and wherein the control circuit is configured to set a level of the controllable variable resistance of the shunt switch circuit.

31. The circuit of claim 30, wherein the shunt switch circuit comprises a plurality of transistor switches connected in parallel with each other, and wherein the control circuit is configured to generate a plurality of control signals applied to control terminals of the plurality of transistor switches.

32. The circuit of claim 31, wherein the control circuit generates the plurality of control signals to sequentially turn on transistor switches of the plurality of transistor switches connected in parallel to decrease the level of the controllable variable resistance over a period of time.

33. The circuit of claim 32, wherein the period of time extends over plural cycles of the PWM drive cycle.

34. The circuit of claim 33, wherein at least one cycle of the PWM drive cycle occurs between two consecutive steps in the sequential turn on of the transistor switches of the plurality of transistor switches.

35. The circuit of claim 26, wherein the on-time and off-time of the PWM drive cycle configure the circuit in a continuous-conduction-mode (CCM) of operation.

\* \* \* \* \*